United States Patent [19]

Kolesnikov et al.

[11] Patent Number: 5,705,106
[45] Date of Patent: Jan. 6, 1998

[54] HEAT-INSULATING STRUCTURAL CARBON MATERIAL AND PROCESS FOR PRODUCING HEAT-INSULATING STRUCTURAL CARBON MATERIAL

[75] Inventors: Sergey Anatoljevich Kolesnikov; Valery Ivanovich Kostikov; Alexander Victorovich Demin; Lyubov Semenovna Kondratova; Alexander Mikhailovich Vasiljev, all of Moscow, Russian Federation

[73] Assignees: Aerospatiale Societe Nationale Industrielle, France; Niigrafit Research Institute, Russian Federation

[21] Appl. No.: 464,799

[22] PCT Filed: Dec. 23, 1993

[86] PCT No.: PCT/FR93/01296

§ 371 Date: Jun. 26, 1995

§ 102(e) Date: Jun. 26, 1995

[87] PCT Pub. No.: WO94/14724

PCT Pub. Date: Jul. 7, 1994

[30] Foreign Application Priority Data

Dec. 27, 1992 [RU] Russian Federation ........ 92013635/33

[51] Int. Cl.$^6$ ..................................... C01B 31/00
[52] U.S. Cl. .................. 264/29.1; 264/29.2; 264/29.7
[58] Field of Search .............................. 428/408, 902, 428/361, 367, 368, 365; 264/29.1, 29.2, 29.3, 29.5

[56] References Cited

U.S. PATENT DOCUMENTS

| | | | |
|---|---|---|---|
| 3,793,204 | 2/1974 | Ardary et al. | 252/62 |
| 4,152,482 | 5/1979 | Reynolds et al. | 428/284 |
| 4,457,967 | 7/1984 | Chareire et al. | 428/212 |
| 4,508,762 | 4/1985 | Rousseau | 427/228 |
| 4,777,093 | 10/1988 | Nelson | 428/408 |

FOREIGN PATENT DOCUMENTS

| | | |
|---|---|---|
| 8112929 | 7/1981 | France. |
| 59-141410 | 8/1984 | Japan. |
| 61-050912 | 3/1986 | Japan. |

*Primary Examiner*—Timothy Speer
*Attorney, Agent, or Firm*—Hayes, Soloway, Hennessey, Grossman & Hage, P.C.

[57] ABSTRACT

The invention relates to a heat-insulating structural carbon material and the process for producing thereof. This heat-insulating structural material is prepared from a suspension of discrete carbon fibers in a viscoplastic liquid such as polyglycol, glycerine and petroleum oils, by molding a preform and orienting discrete filaments, followed by baking the preform and depositing pyrolytic carbon in the porous structure thereof. This heat-insulating material comprises a coke matrix, discrete carbon filaments, the coke matrix as a porous film-like structure of coke residue on said filaments, and pyrolytic carbon.

11 Claims, No Drawings

HEAT-INSULATING STRUCTURAL CARBON MATERIAL AND PROCESS FOR PRODUCING HEAT-INSULATING STRUCTURAL CARBON MATERIAL

SPECIFICATION

1. Field of Invention

The present invention relates to the field of production of refractory structural materials and can be useful in the production of heat insulation for a high-temperature technology, in metallurgy and aerospace engineering.

2. Description of Prior Art

The prior art in the field to which the present invention relates can be characterized by several conventional technical solutions in one or another way directed to obtaining porous (low-density) materials, insofar as porous carbon materials have thermal conductivity 10 to 15 times as low as that of compact carbon materials.

There is known in the art a process for producing porous heat-insulating carbon-based materials by introducing a sponging agent, in particular a metal salt, into the starting components [JP, A, 59-141410]. According to this process, graphite powder is mixed with a binder (synthetic resin or petroleum pitch) and metal salt powder (NaCl). The resulting mixture is molded and upon cooking at a high temperature is subjected to leaching thereby dissolving the salt and forming pores.

The disadvantage of this process resides in obtaining a material having isotropic properties and a rather high thermal conductivity due to thermal radiation within the pores and a high thermal conductivity of graphite.

Also known in the art is a process for producing a porous carbon material based on short carbon fibers and a binder with an additive of a dissolvable granular substance which leads to the pore formation upon dissolving [JP, A, 61-50912]. According to this process small lumps of a mixture consisting of short carbon fibers and a resin are milled, and to the resulting composition a dissolvable granular substance is added. Upon heating and molding under pressure the preform is placed into a solvent, and after dissolving the granular substance, is baked (carbonized).

This process makes it possible to obtain highly porous articles having a narrow small pores distribution and a reasonably high mechanical strength, yet low heat-insulating properties in spite of the porous structure and the presence of fibers, insofar as it does not prevent the radiation heat loss.

Heat transfer in a carbon composite is known to occur either as a heat flow across the structure compact part or via reradiation in the pores. The degree of heat transfer by the heat flow across the monolithic (compact) parts of the composite is defined by the heat flow proportionality to the volume fraction of the solid component in the low direction. Whereas the intensity of heat transfer via reradiation is proportional to the 4th power of the absolute temperature, i.e. it drastically increases with temperature. Therefore in case of a heat-insulating material working under high-temperature conditions with visible radiation being generated, the radiation effect can be reduced by putting shields such as transversely-oriented fibers, in the path thereof.

Further known in the art is a process for producing a low-density heat-insulating carbon material based on discrete fibers 250 to 750 μm long and a carbon-containing binder with an additive of flake graphite [U.S. Pat. No. 4,152,482]. The process comprises mixing carbon fibers, a binder (pitch), and milled natural graphite in a ratio of from 1.0:0.5:1.0 to 1.0:0.7:0.5 (% by weight) followed by carbonizing the binder.

The resulting material of 180 to 200 kg/m$^3$ density exhibits thermal conductivity under vacuum of 0.18 to 0.20 W/(m*K) at 1300K and 0.6 to 0.8 W/(m*K) at 2500K, yet lacks an adequate load-carrying capacity required for structural materials, inasmuch as it is not rigid enough, thus being useful only for filling gaps or requiring additional strengthening means.

Still further known in the art is the most closely related to the presently claimed proposal a process for producing a heat-insulating carbon composite material based on carbon fibers and a carbonized thermosetting binder [U.S. Pat. No. 3,793,204]. The process comprises preparing a suspension of carbon fibers and a powdery thermosetting binder in a dispersive liquid such as water. The water is then removed by pouring the suspension into a tank with a perforated bottom, the resulting fibrous sediment, as intended, being oriented along the tank bottom while water removing. Thereupon the sediment is dried, the polymer thermosetting binder is cured, then heat-treated in an inert atmosphere till getting carbonized.

To obtain preforms of more than 3 cm in thickness, the above-described cycle is repeated several times to prevent the material from buckling.

The use of water as the dispersive liquid according to this process makes it impossible to properly arrange the carbon fibers, inasmuch as water possesses poor wettability with respect to the fibers and the binder particles, resulting in their rapid sedimentation from the suspension, i.e. the suspension itself is unstable in time. Moreover, when removing water (by suction through the mold perforations), the fibers that are carried by the rapid water flow or sedimentation are being oriented to a non-lesser degree in the opposite direction (along the perforation axis).

Furthermore, using water necessitates drying the preform layers sedimented, thereby increasing the duration of and labor input into the process, while giving no additional improvements to the material properties.

Moreover, the coke resulting from the binder (resin or pitch) carbonization has a densified structure in the layers adjacent to the fibers surface, which neither imparts strength to the material, nor improves heat-insulating properties thereof.

And the high content of the binder forming a coke matrix upon carbonizing decreases the material processability, insofar as the carbonization in this case gives rise to internal stresses, cracking, considerable gas evolution, and, as a result, changes of geometrical dimensions and shape of articles being produced according to this technology.

DISCLOSURE OF INVENTION

The essence of the present invention consists in providing a simple and inexpensive production process which would ensure obtaining a low-density (light-weight) heat-insulating material non-prone to shrinkage under baking and possessing load-carrying structural properties, whose heat-insulating characteristics are comparable to those of the prototype described in the prior art review hereinabove.

The solution of the problem pursued is ensured due to the fact that according to the claimed process for producing a structural heat-insulating carbon material which comprises preparing a suspension of discrete carbon fibers by stirring them in a dispersive liquid, molding a preform and orienting the discrete fibers, with a portion of the dispersive liquid being removed, followed by baking the preform in a mold, as the dispersive liquid use is made of a viscoplastic liquid exhibiting a good wettability with respect to the suspension components, the suspension preparation by stirring carbon fibers in a thermoplastic liquid being effected till the fibers are separated into uniformly distributed filaments and after molding and baking, an additional rigidity is imparted to the preform by depositing pyrolytic carbon in its porous structure. The orientation of the filaments is preferably effected by prepouring the suspension over the Nutsch-filter surface, where the preform preshaping is also effected.

The employment of a viscoplastic liquid (polyglycols, glycerine, petroleum oils, or a mixture thereof) as the dispersive liquid is directed to attaining a complex of factors essential for the heat-insulating material and the production process thereof, due to useful work of forces resulting from the interaction of the wetting liquid with the carbon fibers and filaments, as well as the carbonization peculiarities of such a liquid:

preparing a stable suspension of filaments to ensure their smooth sedimentation and orientation parallel to the filtering surface, when partially removing the liquid via filtering;

obtaining a laminated structure preform when hydrodynamically orienting the filaments on the Nutsch-filter;

ensuring stability of the wet preform obtained on the Nutsch-filter;

preventing the material shrinkage when carbonizing the viscoplastic liquid remained in the preform, as well as ensuring low gas evolution;

obtaining upon carbonizing the viscoplastic liquid a coke matrix in the form of a porous film of the coke residue on the filaments and therebetween.

The above factors ensure preparing a preform of a desired thickness (up to 100 mm) in a one-cycle process of molding and baking, and prevent the material from buckling and cracking.

The preparation of the fiber suspension in the viscoplastic liquid medium able to wet the fibers' surfaces promotes a quick separation of the fibers into filaments under the action of wetting forces and formation of the filaments suspension therein actually in a state close to their zero buoyancy. Furthermore, the wettability of the viscoplastic dispersive liquid favors leaving on the filament surface (upon partially removing the liquid by suction) a viscoplastic liquid film ensuring stickiness of the filaments therebetween and thus a possibility of handling them as a single preform, and upon carbonizing the viscoplastic liquid this film is converted into a porous film of a coke residue binding together the filaments. In this case the coke yield is no more than 0.15 g from 1 g of the viscoplastic liquid mass, i.e. much lower (over three times as low) than that from pitch of synthetic resin. Besides, due to the above, under carbonization many of the wetted filaments in the preform tend not to harden at once but rather to gradually get thicker, thus remaining plastic till the complete carbonization is attained. This ensures the absence of internal stresses and cracks and, accordingly, makes it possible to increase the preform thickness in a single cycle.

The use as the viscoplastic liquid of a mixture of pitch and oil (oils) selected from the group of petroleum products ensures the wet preform plasticization, especially required when producing articles of intricate shapes (the wet preform being bent while molding). Here pitch is employed as the plasticizer, becoming such as a result of contact with the viscoplastic liquid which partially dissolves the pitch. Due to the low pitch content, the further conversion thereof into a coke matrix is not detrimental to the material properties.

The preliminary operation of pouring the filaments suspension over the Nutsch-filter surface provides (due to the viscoplastic liquid viscosity, mobility of the filaments wetted therewith, and the slow filtering thereof through the Nutsch-filter perforations) a further means to arrange the filaments carried by the suspension flow along the Nutsch-filter surface and to obtain not only the orientation parallel to the perforated surface, but also a laminated texture of the preform filaments.

In a material of such a texture (with filaments separated by interlayers of the coke residue porous film) a low thermal conductivity is ensured due to the radiation shielding effect of the filament layers.

Prior to baking the preform is postmolded to attain the solid phase/liquid phase ratio therein of 1:10 to 1:4 so as to have the coke residue after baking as a porous film-like structure distributed between the filaments within the material. Such a structure along with the primary load-carrying properties imparts compliance to the material for it is non-brittle.

The application of a pyrolytic carbon layer onto the porous preform surface upon baking makes up for some loss of strength caused by the absence of a conventional binder, and increases the rigidity of the coke residue porous structure without densifying the material.

Accordingly, the complex measures used ensures obtaining a light-weight heat-insulating material possessing a load-carrying capacity and a reasonably low thermal conductivity comparable to conventional materials of the same purpose.

PREFERRED EMBODIMENT OF INVENTION

In order to realize the claimed process and obtain a light-weight heat-insulating material exhibiting a load-carrying capacity, a suspension of discrete carbon filaments in a viscoplastic liquid is prepared. As the viscoplastic liquid use is made of a mixture of coal-tar pitch and glycerine which mixture is prepared either directly prior to mixing the discrete carbon fibers with glycerine or simultaneously therewith. And the starting carbon fibers are to be not over 50 mm long with the pitch addition (particles not over 1 mm) in the amount of not over 0.5% by weight of the fiber.

The fiber length (not over 50mm) is dictated by the fact that in case of longer fibers it is impossible to mill them into filaments 0.2 to 0.5 mm long when stirring the suspension, and no laminated structure is formed. While stirring the suspension components in the viscoplastic liquid, there occurs separation of the fibers into filaments, the latter being milled down to 0.2–0.5 mm lengths, as well as a partial dissolution of the pitch powder. The glycerine is preheated (343–350K) to obtain an optimal viscosity of from 50 to 500 cP, and together with the charge of carbon fibers and pitch is loaded into a mixer where it is stirred for 10 to 20 min until the fibers are separated into filaments and a homogeneous suspension is obtained; the amount of the fiber charge being dependent on the size of the article to be produced (plates, cones, cylinders, etc.). For example, to obtain an article in the form of a plate of 500*500*50 mm, the carbon fiber charge is to be 1.4 to 1.5 kg. Should larger articles need to be obtained, the carbon fiber charge is to be accordingly increased, along with the other components content.

The viscoplastic liquid is taken in the amount of at least 45 kg. Then using a Nutsch-filter the size and shape whereof are consistent with the mold cross-section, there are effected orientation of the carbon filaments, laminated laying-up thereof, as well as a preform first formation. To this end the resulting suspension is poured over the Nutsch-filter net having a passing cross-section of the perforations not over 1 sq. mm so as to attain a uniform distribution thereof all over the Nutsch-filter surface, at the same time initiating the glycerine withdrawal through the Nutsch-filter perforations via evacuation. This is possible due to the viscoplastic liquid (glycerine) good wettability and viscosity and to the laminar type of the suspension spreading (flow) over the Nutsch-filter net, thereby ensuring a laminated laying-up of the filaments.

In case of the viscoplastic liquid viscosity over 500 cP, spreading thereof is hampered and no laminated laying up is attained. Whereas at the viscosity under 50 cP a rapid spreading of the liquid takes place with the laminarity being violated, thereby violating the horizontal filaments orientation and giving rise to the fiber curling. The evacuation degree with increasing the wet preform thickness on the Nutsch-filter, is steadily increased finally resulting in the absolute pressure under the Nutsch-filter of 0.07 to 0.085 MPa.

Upon spending the suspension full portion, the evacuation is further continued for 3 to 5 min per each millimeter of the preform thickness, up to 10 kg of glycerine (with coal-tar pitch) being retained in the preform per each kilogram of the carbon filaments. Then the resulting wet preform is removed from the Nutsch-filter without disturbing the filaments laying-up and put into a mold. The thus obtained wet preform thickness exceeds the designed one, which is necessary to enable the subsequent postmolding of the preform be effected in order to obtain a desired ration of the solid and liquid phases (from 1:10 to 1:4).

At a higher amount of the liquid phase, the wet preform material has a structure that fails to enable the required geometrical dimensions of the article to be obtained; whereas at a lower amount of the liquid phase the filament bonding therebetween is not strong enough, resulting in the formation of a loose structure material without sufficient rigidity.

The preform in the mold is brought down to the design thickness under a specific pressure of up to 0.7 MPa on the press, thereby removing the viscoplastic liquid excessing amount, whereupon the preform is fixed in the mold at this thickness and supplied for baking to carbonize thereof.

The preform carbonization is carried out in an inert or reducing gaseous atmosphere, preferably in a coke (carbon) filling medium. In this case the liquid glycerine and its vapors are trapped by the porous carbon medium and undergo pyrolysis with destruction to simple volatiles (carbon dioxide and steam).

The temperature rise is effected for 24 h up to 1073–1173K, with holding at the upper temperature level for not over 90 h. After carbonizing the preform rigidity is increased by depositing pyrolytic carbon in the porous structure thereof. Despite the fact that after the coke matrix formation the preform is already capable to retain its shape and is machinable, it is still insufficiently rigid: the strain curve of such a material actually has no portion of elastic loading and is of a forced plasticity nature.

And the pyrolytic carbon deposition onto the inner pores surface of the material imparts to the latter elasticity and increased load-carrying capacity, actually without changing the porosity (apparent density) thereof.

The pyrolytic carbon deposition is conducted in an electric vacuum furnace in a city fuel gas the main component whereof is methane. Hydrocarbons and other types of gases (propane, butane, benzene, etc.) may also be employed.

Depending on the methane content in the city fuel gas, the charge, and the furnace space, as well as the temperature of preforms under treatment the process is carried out at the city gas flow rate ensuring the acceptable duration (40 to 100 h) to obtain a material having a desired thermal conductivity. Here the amount of pyrolytic carbon being deposited is 15 to 32% by weight of the preform. At the pyrolytic carbon amount over 32% the material thermal conductivity increases, whereas at the amount under 15% the desired rigidity and, accordingly, the load-carrying capacity, are not attained.

To better understand the present invention, given hereinbelow are specific Examples illustrating the embodiment of the present process for producing a heat-insulating structural material, as well as the testing results.

EXAMPLE 1

An article in the form of a plate of 500*500*50 mm was produced. A suspension was prepared from carbon fibers up to 45 mm long in glycerine with an additive of pitch powder of not over 1 mm grain size. The components were taken in the following amounts, kg:

| | |
|---|---|
| *Carbon fibers | 1.5 |
| *Pitch | 0.3 |
| *Glycerine | 45.0 |

The resulting mixture was stirred in a paddle mixer for 15 min at the speed of 2 rps. The glycerine was preheated up to the temperature of 348K at which a desired viscosity (450 cP) was attained.

By pouring the resulting suspension over the Nutsch-filter surface, the desired thickness (by 10% over the design thickness) was gradually attained, providing under the Nutsch-filter the absolute pressure of 0.07 MPa which was gradually decreased with the preform thickness. The vacuum was further maintained for 5 min. In the resulting (washed-put) preform the solid phase/liquid phase ratio attained was 1:10.

The preform was removed from the Nutsch-filter by turning over the filter content onto an auxiliary plate.

Upon supplying the resulting preform into a mold, it was compressed at a specific pressure of 0.7 MPa until the design thickness of 50 mm was attained.

The preform carbonization was effected in the mold at the temperature of 1173K with the temperature rise for 24 h and exposure for 90 h. Then pyrolytic carbon was deposited onto the pores surface within the preform. The process was conducted in a city gas (90% methane, 5% hydrogen) in a furnace of 6 m³ space under the absolute pressure (2200±665 Pa) and at the temperature of 1223K. The flow rate of the city gas was maintained at 7.5±0.12 m³/h.

The resulting material has the following ratio of the components, % by weight:

| | |
|---|---|
| *Carbon filaments | 46 |
| *Glycerine coke | 18 |
| *Pitch coke | 4 |
| *Pyrolytic carbon | 32 |

The coke in the resulting material was present as a porous film-like structure distributed on the filaments and therebetween. The coke residue surface was coated with pyrolytic carbon.

To determine physico-mechanical properties of the resulting material, there were produced samples of a regular form, mainly in the form of a parallelepiped, by cutting the obtained preforms (articles) with a saw, cutters, or the like, and apparent density, ultimate compressive strength, ultimate bending strength, thermal conductivity, and ash content were measured.

The apparent density was determined on the basis of the sample mass/volume ratio, the volume measurement error not exceeding 0.7%.

The ultimate compressive strength was determined on samples of 20*10*10 mm and 10*10*10 mm.

The resulting material structure was visually investigated using a microscope.

The bending tests (3-point bending) were conducted on samples of 100*20*10 mm.

The thermal conductivity was determined on samples of 10*10*10 mm and 100*12*10 mm on the basis of experimental data on the temperature gradient produced by a standard heat source.

The material ash content was determined via calcination thereof in an alundum closed-type crucible, in a muffle at the temperature of 1173K in air until the residual constant weight was attained.

The results of measuring physico-mechanical properties of the material obtained in Example 1 are presented in Table 1.

TABLE 1

| Characteristics | Measurement unit | Level |
|---|---|---|
| Apparent density | kg/m$^3$ | 190 to 250 |
| Ultimate Strength: | | |
| compressive (across the filaments) | MPa | 1.2 |
| bending (along the filaments) | MPa | 2.8 |
| Thermal conductivity across the filaments at the temp-re, K, in vacuum: | | |
| 300 | W/(m*K) | 0.24 |
| 2000 | | 0.60 |
| Coefficient of thermal expansion: along and across the filaments | *10$^{-6}$ deg$^{-1}$ | 1.2 6.0 |
| Ash content | % | 0.05 to 0.1 |

EXAMPLE 2

A plate of 500*500*80 mm was produced. To prepare a suspension, PAN-based high-modulus carbon fibers having the initial length of 40 to 50 mm were used in the amount of 2.1 kg. As the viscoplastic liquid use was made of glycerine.

Upon stirring the mixture of 15 min at the speed of 2 rps, a suspension for filaments milled to 0.2–0.5 mm was obtained having a viscosity of 400 cP.

Postmolding of a wet preform in a mold was effected under a minimum specific pressure of 0.4 MPa till the solid phase/liquid phase ratio of 1:10 was attained.

Upon carbonizing the preform at 1173K, depositing pyrolytic carbon at 1223K, and heat treating at 2373K, a material was obtained whose physico-mechanical properties are presented in Table 2.

TABLE 2

| Characteristics | Measurement unit | Level |
|---|---|---|
| Apparent density | kg/m$^3$ | 150 to 200 |
| Ultimate compressive strength: across the filaments | MPa | 1.3 |
| along the filaments | | 6.1 |
| Ultimate bending strength: along the filaments | MPa | 1.6 |
| Thermal conductivity at the temp-re, K: | W/(m*K) | |
| 300, across the filaments | | 0.22 |
| 2000, across the filaments | | 0.49 |
| along the filaments | | 0.98 |
| Coefficient of thermal expansion at the temperature of from 300 to 2300 K: | *10$^{-6}$ deg$^{-1}$ | |
| across the filaments | | 6.2 |
| along the filaments | | 1.9 |

The quantitative composition of the material obtained in Example 2 can be characterized as follows, % by weight:

| *High-modulus carbon filaments | 46 |
|---|---|
| *Glycerine coke | 34 |
| *Pyrolytic carbon | 20 |

The results of measuring thermal conductivity of the material obtained in Example 2 are presented in Table 3.

TABLE 3

| Testing | Material | | |
|---|---|---|---|
| tempe- | | Densified with | |
| rature, | Carbonized | pyrolytic carbon | Heat-treated |
| K | Thermal conductivity, W/(m*K) | | |
| 300 | 0.06 | 0.22 | 0.19 |
| 500 | 0.07 | 0.22 | 0.21 |
| 800 | 0.11 | 0.25 | 0.29 |
| 1000 | 0.16 | 0.30 | 0.32 |
| 1200 | 0.21 | 0.33 | 0.35 |
| 1400 | 0.28 | 0.38 | 0.40 |
| 1600 | 0.37 | 0.43 | 0.46 |
| 1800 | 0.48 | 0.51 | 0.53 |
| 2000 | 0.60 | 0.60 | 0.62 |
| 2200 | 0.76 | 0.72 | 0.75 |
| 2400 | 0.97 | 0.97 | 0.92 |
| 2600 | 1.25 | 1.05 | 1.10 |
| 2800 | 1.66 | 1.23 | 1.34 |

EXAMPLE 3

The procedure of Example 2 was followed, except that rayon-based carbon fibers were used which were subjected to premilling.

The heat treatment after carbonization was conducted at 1873K to obtain a material the properties whereof are presented in Table 4.

TABLE 4

| Characteristics | Measurement unit | Level |
| --- | --- | --- |
| Apparent density | kg/m$^3$ | 200 |
| Ultimate compressive strength, across the filaments | MPa | 2.0 |
| Ultimate bending strength, across the filaments | MPa | 1.6 |
| Thermal conductivity at the temp-re, K: across the filaments | W/(m*K) | |
| 300 | | 0.25 |
| 2000 | | 1.25 |
| Coefficient of thermal expansion at the temperature of from 300 to 2300 K, along the filaments | $-10^{-6}$ deg$^{-1}$ | 2.4 |
| Ash content | % | 0.03 |

The resulting material has the following composition % by weight:

| | |
| --- | --- |
| *Carbon filaments | 48 |
| *Glycerine coke | 37 |
| *Pyrolytic carbon | 15 |

EXAMPLE 4

The procedure of Example 1 was followed, except that as the viscoplastic liquid use was made of ethylene glycol without pitch addition. A plate of 500*500*45 mm was produced. Carbon fibers were taken in the amount of 1.0 kg, and ethylene glycol was used at room temperature (without pre-heating) in view of the ethylene glycol low viscosity (about 340 cP).

A wet preform was treated on the Nutsch-filter till the thickness of 60 mm was attained, whereupon it was post-molded by 25% (down to 45 mm, the solid phase/liquid phase ratio of 1:4).

Upon carbonizing the preform and depositing pyrolytic carbon, a material was obtained the properties whereof are presented in Table 5.

TABLE 5

| Characteristics | Measurement unit | Level |
| --- | --- | --- |
| Apparent density | kg/m$^3$ | 250 to 350 |
| Ultimate bending strength along the filaments at the temperature, K: | MPa | |
| 300 | | 2.50 |
| 1800 | | 2.80 |
| 2000 | | 2.45 |
| Ultimate compressive strength across the filaments | MPa | 2.0 |
| along the filaments | | 4.3 |
| Thermal conductivity across the filaments at the temp-re, K: | W/(m*K) | |
| 300 | | 0.18 |
| 2000 | | 0.70 |
| Ash content | % | 0.06 |

The resulting material had the following composition, % by weight:

| | |
| --- | --- |
| *Carbon filaments | 51 |
| *Ethylene glycol coke | 26 |
| *Pyrolytic carbon | 23 |

EXAMPLE 5

A plate of 500*500*50 mm was produced. As the viscoplastic liquid use was made of petroleum oils (vacuum oils) having a viscosity of up to 10 cSt at 327K. 0.45 kg of coal-tar pitch having a particle size of up to 1.5 mm were added to 45 kg of the oil.

A suspension was prepared from 1.2 kg of PAN-based carbon fibers 50 mm long having a viscosity of 200 cP and the solid phase/liquid phase ratio of 1: 9. The remaining properties are presented in Table 6.

TABLE 6

| Characteristics | Measurement unit | Level |
| --- | --- | --- |
| Apparent density | kg/m$^3$ | 320 to 340 |
| Ultimate compressive strength across the filaments | MPa | 1.6 |
| Ultimate bending strength along the filaments | MPa | 3.0 |
| Thermal conductivity at the temp-re, K: | W/(m*K) | |
| 300 | | |
| across the filaments | | 0.22 |
| along the filaments | | 0.55 |
| 2000 | | |
| across the filaments | | 0.60 |
| along the filaments | | 1.65 |
| Coefficient of thermal expansion in the temperature range of from 300 to 2300 K | $-10^{-6}$ deg$^{-1}$ | |
| along the filaments | | 1.8 |
| across the filaments | | 6.2 |
| Ash content | % | 0.1 |

The resulting material had the following composition, % by weight:

| | |
| --- | --- |
| *Carbon filaments | 42 |
| *Petroleum oil coke | 20 |
| *Pitch coke | 12 |
| *Pyrolytic carbon | 26 |

As follows from the above-presented Examples, the thermal conductivity level of the material according to the claimed process is actually independent of the viscoplastic liquid and the carbon fiber types.

And the milling degree of carbon fibers (filaments) in the suspension prepared, gets actually the same (0.2–0.5 mm) upon stirring regardless of the initial carbon fiber length (not over 50 mm).

All the samples investigated have the fiber laminated laying-up and the coke matrix in the form of a filmlike structure.

INDUSTRIAL APPLICATION

The present invention can be useful for producing rigid heat-insulating structures, such as ducts, cylinders, lining members, heat-insulating housings for various apparatuses both of regular and intricate configurations.

We claim:

1. A process for producing a carbon structural thermal insulator, and comprising, preparing a suspension of discrete carbon fibers by mixing said fibers while agitating said fibers in a dispersive liquid, each of said discrete carbon fibers being made of a plurality of discrete filaments, molding a preform and orienting said discrete filaments, eliminating part of said dispersive liquid, and baking said preform in a mold, wherein said dispersive liquid is a non-water-containing viscoplastic liquid having a good wettability compared to components of said suspension, during preparation of said suspension said carbon fibers are mixed and agitated in said viscoplastic liquid until the fibers separate into said filaments such that said filaments are uniformly distributed by carbonizing said viscoplastic dispersive liquid in said preform, a porous structure of coke residue is formed on said filaments and additional rigidity is given to said preform after molding and baking of said preform by depositing pyrolytic carbon in the porous structure of said preform.

2. A process according to claim 1, wherein said viscoplastic liquid is a polyglycol or glycerin.

3. A process according to claim 1, wherein said viscoplastic liquid comprises a petroleum oil.

4. A process according to claim 1, wherein said viscoplastic liquid is a mixture of pitch and a polyglycol.

5. A process according to claim 1, orienting of the filaments is brought about by pouring beforehand the said suspension onto a surface of a filter whereon a preform is first shaped.

6. A process according to claim 1, wherein said suspension is prepared and used in a heated state upon attaining viscosity of 50 to 500 cP.

7. A process according to claim 1, said suspension is prepared from fibers at most 50 mm long.

8. A process according to claim 1, wherein upon removing a portion of said viscoplastic liquid and preshaping a preform, the latter is postmolded in a mold until a solid phase/liquid phase ratio of 1:10 to 1:4 is attained.

9. A process according to claim 1, wherein said viscoplastic liquid is a mixture of pitch and at least one petroleum oil.

10. A process according to claim 1, wherein said viscoplastic liquid is a mixture of pitch and a mixture of petroleum oils.

11. A process according to claim 1, wherein said viscoplastic liquid is a mixture of pitch and glycerin.

* * * * *